United States Patent
Matsuo

(10) Patent No.: US 9,441,097 B2
(45) Date of Patent: Sep. 13, 2016

(54) RUBBER COMPOSITION AND TIRE PRODUCED BY USING THE SAME

(75) Inventor: Shigeaki Matsuo, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 19 days.

(21) Appl. No.: 13/996,271

(22) PCT Filed: Dec. 21, 2011

(86) PCT No.: PCT/JP2011/079693
§ 371 (c)(1),
(2), (4) Date: Aug. 21, 2013

(87) PCT Pub. No.: WO2012/086711
PCT Pub. Date: Jun. 28, 2012

(65) Prior Publication Data
US 2013/0324668 A1   Dec. 5, 2013

(30) Foreign Application Priority Data
Dec. 21, 2010  (JP) ................. 2010-284024

(51) Int. Cl.
*C08L 9/00* (2006.01)
*B60C 1/00* (2006.01)
*C08L 7/00* (2006.01)
*C08L 9/06* (2006.01)
*C08L 21/00* (2006.01)

(52) U.S. Cl.
CPC .............. *C08L 9/00* (2013.01); *B60C 1/0016* (2013.04); *C08L 7/00* (2013.01); *C08L 9/06* (2013.01); *C08L 21/00* (2013.01)

(58) Field of Classification Search
CPC .......... B60C 1/0016; C08L 7/00; C08L 9/06; C08L 21/00
USPC ................................................ 525/232, 240
See application file for complete search history.

(56) References Cited

U.S. PATENT DOCUMENTS

| | | | |
|---|---|---|---|
| 4,957,976 A | 9/1990 | Takao et al. | |
| 5,015,692 A | 5/1991 | Takao et al. | |
| 5,232,987 A | 8/1993 | Sakakibara et al. | |
| 7,799,856 B2 | 9/2010 | Nohara et al. | |
| 8,110,625 B2 | 2/2012 | Nohara et al. | |
| 2004/0249032 A1 | 12/2004 | Nohara et al. | |
| 2005/0115652 A1* | 6/2005 | Augier et al. | C06B 45/10 149/109.6 |
| 2006/0030657 A1 | 2/2006 | Hogan et al. | |
| 2007/0155902 A1 | 7/2007 | Masaki | |
| 2010/0298488 A1 | 11/2010 | Nohara et al. | |
| 2011/0190440 A1* | 8/2011 | Ohta et al. | B60C 1/0008 524/526 |
| 2013/0053504 A1* | 2/2013 | Veyland et al. | B60C 1/0016 524/526 |
| 2013/0210156 A1* | 8/2013 | Wooley et al. | A61B 5/14539 436/63 |
| 2013/0247996 A1* | 9/2013 | Tronc et al. | B32B 1/08 137/1 |

FOREIGN PATENT DOCUMENTS

| | | |
|---|---|---|
| CN | 1934182 A | 3/2007 |
| EP | 1854839 A1 | 11/2007 |
| EP | 2098540 A1 | 9/2009 |
| EP | 2258765 A1 | 12/2010 |
| JP | 1-197541 A | 8/1989 |
| JP | 6-57767 B2 | 8/1994 |
| JP | 2003-176378 A | 6/2003 |
| JP | 2005-298804 A | 10/2005 |
| JP | 2006-504866 A | 2/2006 |
| WO | 2004/041870 A2 | 5/2004 |

OTHER PUBLICATIONS

International Preliminary Report on Patentability and Written Opinion issued Jul. 11, 2013 in International Application No. PCT/JP2011/079693.
Communication dated Nov. 7, 2014 from the European Patent Office in counterpart application No. 11850661.7.

* cited by examiner

*Primary Examiner* — Nathan M Nutter
(74) *Attorney, Agent, or Firm* — Sughrue Mion, PLLC

(57) ABSTRACT

A rubber composition containing 100 parts by mass of a rubber component (A) comprising at least one rubber of natural rubber and synthetic diene base rubbers and 5 to 120 parts by mass of a low molecular weight aromatic vinyl compound-diene compound copolymer (B) having a weight average molecular weight (measured by gel permeation chromatography and reduced to polystyrene) of 1,000 to 300,000 and, wherein the copolymer (B) comprises 0 to 80% by mass of an aromatic vinyl compound and has a vinyl bond content of 0 to 80% by mass in the part of the diene compound, and has a cross-linkable functional group at an end. Further, tires produced by using the rubber composition are provided.

16 Claims, No Drawings

RUBBER COMPOSITION AND TIRE PRODUCED BY USING THE SAME

CROSS REFERENCE TO RELATED APPLICATIONS

This application is a National Stage of International Application No. PCT/JP2011/079693 filed Dec. 21, 2011, claiming priority based on Japanese Patent Application No. 2010-284024 filed Dec. 21, 2010, the contents of all of which are incorporated herein by reference in their entirety.

TECHNICAL FIELD

The present invention relates to a rubber composition which is excellent in low heat build-up, durability and processability, more specifically to a rubber composition containing a low molecular weight synthetic rubber having a cross-linkable functional group at an end as a rubber component, and a tire produced by using the same.

BACKGROUND ART

In recent years, requirements for a low fuel consumption of automobiles are becoming severer in connection with the movement of global emission control of carbon dioxide which follows social requirement for energy saving and a rise in concern about environmental problems. In order to meet the above requirements, tires which are reduced in rolling resistance and have low heat build-up as tire performances have come to be demanded. In respect to a method for reducing rolling resistance of a tire, it is carried out as the most usual method to use a material exhibiting lower heat build-up as a rubber composition.

Many technologies such as addition of loss reducing agents, improvement in dispersibility of carbon black added as a filler for reinforcement by modification of polymers and use of silica for a filler have so far been studied as techniques for reducing heat generation of rubbers.

A lot of modified rubbers interacting with fillers such as carbon black and silica have so far been developed as a method for improving rubber components (patent document 1), but a satisfactory modifying effect in rubber compositions compounded with carbon black and silica is not necessarily obtained. Also, liquid styrene-butadiene rubbers having a low molecular weight are used in order to improve abrasion resistance (patent documents 2 and 3). Further, a technology for improving a storage modulus includes compounding of polyethylene glycol polymaleate (PEGM) (patent document 4).

PRIOR ART DOCUMENTS

Patent Documents

Patent document 1: Patent Publication Hei 6 No. 57767
Patent document 2: Patent Application Laid-Open Hei 1 No. 197541
Patent document 3: Patent Application Laid-Open No. 2005-298804
Patent document 4: Patent Application Laid-Open No. 2003-176378

OUTLINE OF THE INVENTION

Problems to be Solved by the Invention

An object of the present invention is to provide a rubber composition which is excellent in low heat build-up (small loss factor tan δ) without damaging processability and which has a high storage modulus (G'), and a tire which is prepared by using the rubber composition as a member therefor and which has small rolling resistance and is excellent in low heat build-up and abrasion resistance.

Means for Solving the Problems

The present invention relates to a rubber composition comprising 100 parts by mass of a rubber component (A) comprising at least one rubber of natural rubber and synthetic diene base rubbers and 5 to 120 parts by mass of a copolymer (B) which is a low molecular weight aromatic vinyl compound-diene compound copolymer having a weight average molecular weight (measured by gel permeation chromatography and reduced to polystyrene) of 1,000 to 300,000 and which has a cross-linkable functional group at an end, wherein the copolymer (B) described above comprises 0 to 80% by mass of an aromatic vinyl compound, and a content of a vinyl bond in the part of the diene compound is 0 to 80% by mass, and it further relates to a tire prepared by using the rubber composition.

In the copolymer having a cross-linkable functional group at an end, a polymer product having functionality at a tip of a polymer chain can be obtained by selecting a specific functional anionic polymerization initiator, and the copolymer provided with a functional group at an end of the polymer obtained by anionic polymerization can be obtained by terminating the living polymer with a functional compound.

The number of free ends in the copolymer is decreased by the functional group in the copolymer having a functional group, and aggregation of a filler is inhibited by interaction of the functional group with the filler particles, which results in inhibiting tan δ from being deteriorated due to separation of an aggregate of the filler.

A functional group having affinity to carbon black and silica which are used as fillers is preferred as the functional group, and such a functional group includes functional groups containing sulfur.

Effects of the Invention

According to the present invention, compounding of the copolymer which is a low molecular weight aromatic vinyl compound-diene compound copolymer and which has a cross-linkable functional group at either one or both of ends makes it possible to notably improve a loss factor and a storage modulus (G') of the rubber composition without damaging processability thereof, and use of the rubber composition for tire members makes it possible to provide a tire which is excellent in low heat build-up and durability and has a low fuel consumption and contribute to energy saving to a large extent.

MODE FOR CARRYING OUT THE INVENTION (1) Rubber Composition:
The rubber composition comprises 100 parts by mass of the rubber component (A) and 5 to 60 parts by mass of the copolymer (B) having a prescribed low molecular weight.
(2) Rubber Component (A):
The rubber component (A) comprises at least one rubber of natural rubber and synthetic diene base rubbers. Various polymers can be applied, and polymers prepared by emulsion polymerization or solution polymerization are preferred. Also, polymers having a glass transition temperature Tg of −60° C. or higher are preferred from the viewpoint of abrasion resistance, heat resistance and the like.

Capable of being exemplified as the synthetic diene base rubbers are cis-1,4-polyisoprene, styrene-butadiene copolymers (SBR), low cis-1,4-polybutadiene, high cis-1,4-polybutadiene, ethylene-propylene-diene copolymers, chloroprene rubbers, halogenated butyl rubbers, acrylonitrile-butadiene rubbers and the like, and the natural rubber and the synthetic diene base rubbers can be used not only alone but also in a mixture.

The preferred rubber component (A) is at least one of natural rubber, cis-1,4-polyisoprene, SBR and polybutadiene. The rubber component (A) contains preferably 15% by mass or more of a styrene-butadiene copolymer or a butadiene polymer (A1) having a weight average molecular weight of 300,000 to 1,500,000. The copolymer (A1) comprises preferably 0 to 60% by mass of an aromatic vinyl compound, and a content of a vinyl bond in the part of the diene compound is 10 to 80% by mass.

The rubber component (A) can secure compatibility in the prescribed ranges and stably improves G' and tan δ.

To be specific, the copolymer (A1) is preferably an emulsion-polymerized styrene-butadiene copolymer comprising 0% by mass or more of an aromatic compound, or a butadiene polymer, or a solution-polymerized styrene-butadiene copolymer which comprises 0% by mass or more of an aromatic compound and in which a content of a vinyl bond in the part of the diene compound is 10% by mass or more, or a butadiene polymer.

The copolymer (A1) contained in the rubber component (A) in a proportion of 50% by mass or more is preferred from the viewpoint that the improving effect brought about by the combination of the prescribed low molecular weight copolymer (B) is notable.

(3) Low Molecular Weight Aromatic Vinyl Compound-Diene Compound Copolymer (B) Having a Cross-Linkable Functional Group at an End:

It is a compound obtained by copolymerizing an aromatic vinyl compound and a diene compound which are monomers, and it is a copolymer having a cross-linkable functional group at an end. It has a weight average molecular weight of 1,000 to 300,000 (measured by gel permeation chromatography and reduced to polystyrene). The copolymer (B) comprises 0 to 80% by mass, preferably 0 to 60% by mass and more preferably 0 to 50% by mass of the aromatic vinyl compound and has a content of a vinyl bond of 0 to 80% by mass, preferably 0 to 60% by mass and more preferably 0 to 50% by mass in the part of the diene compound. Also, a difference between the contents of the vinyl compound in the copolymer (A1) and the copolymer (B) is preferably 30% by mass or less. If the difference between the contents of the aromatic vinyl compound exceeds 30% by mass, there is the possibility that the compatibility is liable to be reduced and that the sufficiently high fracture strength is not obtained.

The copolymer (B) has a weight average molecular weight of 1,000 to 300,000, preferably 1,000 to 200,000, more preferably 1,000 to 150,000 and particularly preferably 1,000 to 100,000. The copolymer having a higher molecular weight is excellent in a storage modulus and a loss factor, but the copolymer having a molecular weight of 300,000 or more is reduced in workability. Also, the narrower molecular weight distribution is more preferred, and Mw/Mn is preferably 5.0 or less. The copolymer having a broader molecular weight distribution tends to be inferior in tan δ.

Either of the copolymers comprising more than 80% by mass of the aromatic vinyl compound or the diene compound having a content of a vinyl bond exceeding 80% by mass is unsatisfactory in improvement with compatibility in desired workability, a storage modulus and tan δ. The content of vinyl bond prescribed above represents a content of vinyl bonds contained in structural units originating from the diene compound, and it represents a ratio of vinyl bonds based on a content of all bonds including other bonds represented by a cis bond and a trans bond.

The low molecular weight copolymer (B) is used in an amount of 5 to 120 parts by mass, preferably 5 to 80 parts by mass and more preferably 5 to 60 parts by mass per 100 parts by mass of the rubber component (A).

The aromatic vinyl compound includes styrene, p-methylstyrene, m-methylstyrene, p-tert-butylstyrene, α-methylstyrene, chloromethylstyrene, vinyltoluene and the like. It includes preferably styrene, p-methylstyrene and α-methylstyrene. It is particularly preferably styrene.

Butadiene, isoprene, pentadiene, 2,3-dimethylbutadiene and the like are used as the diene compound, and butadiene is particularly preferred.

The low molecular weight copolymer (B) used in the present invention has a cross-linkable functional group (called a functional polymer) at an end. In the copolymer, a polymer product having functionality at a tip of a polymer chain can be obtained by selecting a specific functional anionic polymerization initiator, and the copolymer provided with a functional group at an end of the polymer obtained by anionic polymerization can be obtained by terminating the living polymer with a functional compound.

A sulfur-containing lithio compound involving lithio•alkyl•thioacetal and lithio•aryl•thioacetal can be used as a polymerization initiator for polymerizing the aromatic vinyl compound and the diene compound to obtain the functional polymer.

The sulfur-containing lithio compound which is suitable as the initiator is represented by the following formula.

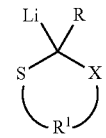

(wherein R is selected from a trialkylsilyl group having 1 to 6 carbon atoms, an alkyl group having 1 to 20 carbon atoms, a cycloalkyl group having 4 to 20 carbon atoms, an aryl group having 6 to 20 carbon atoms, a thienyl group, a furyl group and a pyridyl group, and R may be optionally substituted with at least one of the following functional groups: an alkyl group having 1 to 10 carbon atoms, an aryl group having 6 to 20 carbon atoms, an alkenyl group having 2 to 10 carbon atoms, a non-terminal alkynyl group having 3 to 10 carbon atoms, ether, tert-amine, oxazoline, thiazoline, phosphine, sulfide and silyl; $R^1$ is selected from the group consisting of alkylene groups having 2 to 8 carbon atoms; and X is selected from the group consisting of sulfur, oxygen and NR(R is the same as defined above)).

The preferred lithio•alkyl•thioacetal initiator is 2-lithio-2-methyl-1,3-dithiane represented by the following formula:

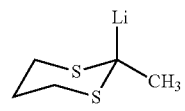

The preferred lithio•aryl•thioacetal initiator is 2-lithio-2-phenyl-1,3-dithiane (PDT-Li) represented by the following formula:

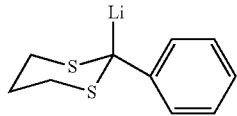

The examples of the other initiators of the present invention include lithio compounds represented by the following formula:

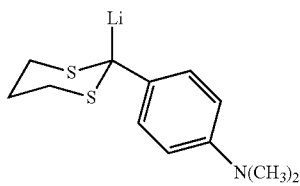

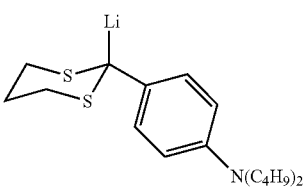

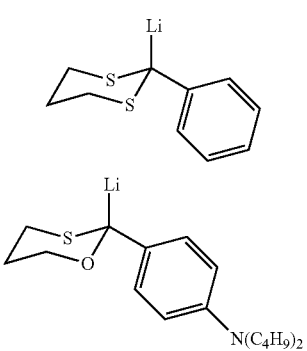

The sulfur-containing lithio initiator used in the present invention can be produced by reacting an initiator precursor compound with an organic lithium compound such as n-butyllithium. The initiator precursor is represented by the following formula.

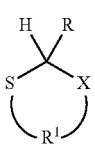

(wherein R, R¹ and X are the same as defined above).

The kind of the representative precursors includes the following compounds:

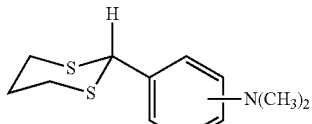

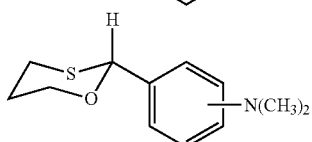

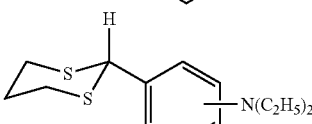

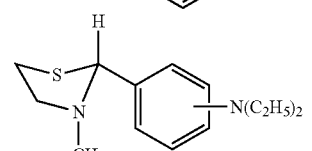

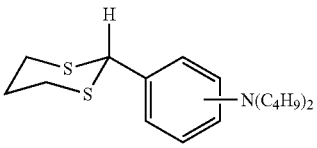

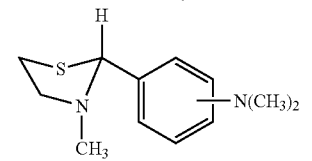

The sulfur-containing lithio initiator produced from the initiator precursor and the organic lithium compound, particularly 2-lithio-2-methyl-1,3-dithiane and 2-lithio-2-phenyl-1,3-dithiane can be synthesized in the following manner, but that shall not be restricted thereto.

That is, a solution of 2-lithio-2-methyl-1,3-dithiane or 2-lithio-2-phenyl-1,3-dithiane which is commercially available is added to dried tetrahydrofuran, and the solution is cooled down to about −78° C. Next, a solution containing butyllithium and hexane is added thereto. Then, the resulting solution is stirred for about 3 hours and left standing at a temperature of lower than about 10° C. for a night.

The solution thus obtained can be used to initiate anionic polymerization.

The above type of the initiator may be produced in a suited reaction vessel equipped with a polymerization reactor before adding a monomer solution.

The anionic polymerization initiator is produced preferably in situ, and it can be synthesized in situ in a solution containing monomers to be polymerized. In general, the anionic polymerization initiator is produced in situ with preparing a solution of a polymerization solvent and monomers to be polymerized. The solution is heated to usually about −80 to about 100° C., more preferably about −40 to about 50° C. and most preferably about 0 to about 25° C., and an initiator precursor which is not lithiated and an organic lithium compound are added thereto. Next, the solution is heated at a temperature falling in a range of about −80 to about 150° C., more preferably about 25 to about 120° C. and most preferably about 50 to about 100° C. to react them for about 0.02 to 168 hours, more preferably about 0.08 to 48 hours and most preferably about 0.16 to 2 hours, or for a time enough for the solution containing the functional polymer to be prepared. The reaction time and temperature may be varied depending on necessity for polymerizing the monomer solution after reacting the precursor with the organic lithium compound.

The examples of synthesis of the initiator in situ include an example in which a solution containing hexane, a styrene monomer and butadiene is used, but they shall not be restricted thereto. In the above example, the solution is heated to about 24° C., and 2-methyl-1,3-dithiane and butyllithium are added thereto. Next, the solution is heated to about 54° C. to react them for about 40 minutes.

The initiator is effective for providing the living polymer obtained by anionic polymerization with a cross-linkable functionality. The functional polymers are formed by reacting the anionic initiator with specific unsaturated monomers to proliferate a polymer structure thereof. During forming the polymer and proliferating the polymer structure thereof, the polymer structure is anionic and "living". The monomers added to the reaction system can continuously be combined with a living end of the chain to increase the polymerization degree. Accordingly, the living polymer is a polymer fragment having a living end or a reactive end.

The anionic polymerization initiator can be used in largely different amounts depending on the desired polymer characteristics. In one embodiment, about 0.1 to about 100 mmol in terms of lithium per 100 g of the monomers is preferably used, and about 0.33 to 10 mmol of lithium per 100 g of the monomers is more preferably used.

The monomers which can be used for producing the living polymer obtained by anionic polymerization include all monomers which can be polymerized according to technologies of anionic polymerization. The suited monomers include diene compounds and aromatic vinyl compounds, but they shall not be restricted thereto.

In the above polymerization, anionic polymerization is carried out, to be typical, in a polar solvent such as tetrahydrofuran (THF) or in various cyclic and non-cyclic non-polar hydrocarbons such as hexane, heptane, octane, pentane and alkylated derivatives thereof, mixtures thereof and benzene.

In order to promote randomization in the copolymerization of the diene compound and the aromatic vinyl compound to control a vinyl content thereof, a polar coordinator may be added to the polymerization materials. An amount thereof falls in a range of 0 to 90 equivalent or more per an equivalent of lithium. The amount thereof is determined according to the desired vinyl content, the level of the aromatic vinyl compound used and the polymerization temperature, and in addition thereto, the properties of the specific polar coordinator (modifier) used. The suited polymerization modifier includes, for example, ethers or amines which bring about the desired fine structure and randomization of the copolymer units.

Compounds which are useful as the polar coordinator include compounds having a hetero atom of oxygen or nitrogen and a non-bonding electron pair. The examples thereof include dialkyl ethers of monoalkylene glycols and oligoalkylene glycols, crown ethers, tertiary amines such as tetramethylethylenediamine (TEMEDA), linear THF oligomers and the like.

The specific examples of the compounds which are useful as the polar coordinator include linear and cyclic oligomeric oxolanyl alkanes comprising tetrahydrofuran (THF), 2,2-bis (2'-tetrahydrofuryl)propane and the like, dipiperidylethane, dipiperidylmethane, hexamethylphosphoramide, N,N'-dim-ethylpiperazine, diazabicyclooctane, dimethyl ether, diethyl ether, trimethylamine and the like. The linear and cyclic oligomeric oxolanyl alkane modifiers are described in U.S. Pat. No. 4,429,031.

In order to terminate the polymerization and control a molecular weight of the polymer, a terminator, a coupling agent or a linking agent may be used, and all the above substances are called terminating reagents in a lump in the present specification. The useful terminator, coupling agent or linking agent includes active hydrogen compounds such as water or alcohols. Some of the above reagents provide the resulting polymer with a multifunctionality. That is, the polymer produced by using the initiator described above has a group having the functionality described above at a tip thereof, and it may have a second functional group as the result of using the terminator, the coupling agent or the linking agent for the synthesis of the polymer.

The useful functional terminating reagents include tin tetrachloride, $(R)_3SnCl$, $(R)_2SnCl_2$, $RSnCl_3$, carbodiimide, N-cyclic amides, N,N'-disubstituted cyclic ureas, cyclic amides, cyclic ureas, isocyanates, Schiff bases, 4,4'-bis (diethylamino)benzophenone, alkylthiothiazolines, carbon dioxide and the like. Further, the other substances include $Si(OR)_4$, $RSi(OR)_3$ and $R_2Si(OR)_2$ which are alkoxysilanes, cyclic siloxanes and mixtures thereof. In the above cases, R in the organic parts is selected from the group consisting of an alkyl group having 1 to about 20 carbon atoms, a cycloalkyl group having about 3 to about 20 carbon atoms, an aryl group having about 6 to about 20 carbon atoms and an aralkyl group having about 7 to about 20 carbon atoms. The specific alkyl group includes n-butyl, s-butyl, methyl, ethyl, isopropyl and the like. The cycloalkyl group includes cyclohexyl, menthyl and the like. The aryl group and the aralkyl group include phenyl, benzyl and the like. Also, R may be a group containing a hetero atom such as nitrogen, silicon, sulfur and oxygen.

The preferred terminating reagents are tin tetrachloride, tributyltin chloride, dibutyltin dichloride, tetraethyl orthosilicate and 1,3-dimethyl-2-imidazolidinone (DMI). The terminating reagents shall not be restricted to the above specific reagents or kinds thereof.

The polymer is preferably provided with a cross-linkable functional group at an end thereof after terminating the polymerization, and the polymerization is terminated more preferably by coupling reaction using other coupling agents such as tin tetrachloride or silicon tetrachloride ($SiCl_4$) and esters. The second functional group which is present in the terminating reagent and which has affinity to the filler is introduced into the polymer by the reaction.

The living polymer obtained by anionic polymerization can be produced by any of a batch process, a semi-batch process and a continuous process.

For example, batch polymerization is initiated by charging a suited reaction vessel with a mixture of monomers and a usual alkane solvent and then adding the polar coordinator (when used) and the initiator compound. The reactants are heated to a temperature of about 20 to about 130° C. to expedite the polymerization for about 0.1 to about 24 hours. A reactive polymer having a reactive end or a living end is obtained by the reaction. Preferably, at least about 30% of the polymer molecules has a living end. More preferably, at least about 50% of the polymer molecules has a living end. Further preferably, at least about 80% of the polymer molecules has a living end.

The low molecular weight aromatic vinyl compound-diene compound copolymer (B) used in the present invention is preferably a solution-polymerized styrene-butadiene copolymer which is suitably produced by subjecting styrene and butadiene to solution polymerization.

In an example of a production process for the copolymer (B), a diene compound such as 1,3-butadiene containing a small amount of 1,2-butadiene is copolymerized with styrene in a hydrocarbon solvent using the anionic polymerization initiator as an initiator in a reactor of a tank type or a tower type, whereby a cross-linkable polymer having a reactive end or a living end having a cross-linkable functional group can be obtained.

In the rubber composition of the present invention, active sites are formed through cleavage reaction, decomposition reaction or addition reaction of the cross-linkable functional group by using the low molecular weight copolymer (B) having a cross-linkable functional group at the end, and they are reacted with the high molecular weight rubber component (A) comprising natural rubber and/or a synthetic diene base rubber, so that the rubber component (A) and the copolymer (B) are effectively entangled to improve the durability.

(4) Filler:

Further, the rubber composition can contain various fillers. At least one of carbon black (C/B), silica, calcium carbonate, titanium oxide and the like is used as the filler, and at least one of carbon black (C/B) and silica is preferably used.

The filer can be added in an amount of 30 to 90 parts by mass per 100 parts by mass of the rubber component (A). If it is less than 30 parts by mass, a fracture characteristic, abrasion resistance and the like of the vulcanized product are not sufficiently high, and if it exceeds 90 parts by mass, it is not preferred in terms of the workability. The examples of C/B used as the filler include the classes of FEF, HAF, ISAF. SAF and the like, and they are particularly preferably the classes of ISAF to HAF or the classes of SAF to HAF. The examples of silica include precipitated amorphous silica, wet silica (hydrated silica), dry silica (silicic acid anhydride), fumed silica, calcium silicate and the like, but they shall not be restricted to the above compounds. Among them, precipitated, amorphous silica and wet treatment (wet-process) hydrated silica are preferred. A compounding ratio in using C/B and silica in combination may be optionally varied according to the compounding purposes.

(5) Other Additives:

The rubber composition can be compounded with the rubber component (A), the copolymer (B) and the filler each described above, and in addition thereto, a vulcanizing agent, a vulcanization accelerator, and if necessary, a silane coupling agent, a vulcanization accelerator activator, an antioxidant, an anti-ozonant, an antioxidant, a process oil, zinc oxide, stearic acid and the like which are usually used in the rubber industry.

The vulcanizing agent includes, for example, sulfur and the like, and a use amount thereof is 0.1 to 10 parts by mass, preferably 0.5 to 5.0 parts by mass in terms of a sulfur content per 100 parts by mass of the rubber component (A). If it is less than 0.1 part by mass, the vulcanized rubber is reduced in a fracture characteristic and abrasion resistance, and if it exceeds 10 parts by mass, the rubber elasticity tends to be lost.

At least one of paraffin base oils, naphthene base oils, aromatic base oils and the like can be used as the process oil. The aromatic base oils are preferably used for applications in which the fracture characteristic and the abrasion resistance are regarded as important, and the naphthene base oils or the paraffin base oils are preferably used for applications in which the low heat build-up and the low temperature characteristic are regarded as important.

The rubber composition of the present invention is obtained by kneading the components by means of an open type kneader such as a roll and an internal mixer such as a Banburyl mixer. It is vulcanized after mold processing and suitably used as a rubber for tires, and it can be applied to various tire members such as tread rubbers (including cap rubbers and base rubbers), side rubbers, side-reinforcing rubbers and inner liner rubbers.

The tire of the present invention is characterized by applying the rubber composition described above to members thereof. A tire prepared by using the rubber composition for a tread member has low rolling resistance and is excellent in abrasion resistance since the rubber composition has low heat build-up. Air which is normal or changed in an oxygen partial pressure, or an inert gas such as nitrogen can be used as a gas filled in the tire of the present invention.

EXAMPLES

The present invention shall be explained below in detail with reference to examples and comparative examples, but the present invention shall by no means be restricted to the following examples.

In the following examples and comparative examples, various measurements and evaluations were carried out according to the following methods.

(1) Determination of Molecular Weight:

The molecular weight was determined by gel permeation chromatography (GPC) using a Waters Model 150-C instrument equipped with a Model 2414 refractometer and a Model 996 photodiode•array•detector (UV). The molecular weight was calculated from a general purpose calibration curve based on a polystyrene•standard and corrected by using a Mark-Houwink constant: k=0.000269, α=0.73 for the following SBR.

(2) Confirmation of Contents of Styrene and Vinyl:

The confirmation of the contents of styrene and vinyl were determined by using the results of $^1$H-NMR ($CDCl_3$) and $^{13}$C-NMR measured by means of Gemini 300 NMR spectrometer system of 300 MHz (Varian).

(3) Column Chromatography:

Column chromatography was carried out by using a silica gel adsorbent (200 to 425 mesh, manufactured by Fisher Scientific).

(4) Processability:

The processability was evaluated by measuring a Mooney viscosity ($ML_{1+4}$/130° C.) of the rubber composition at 130° C. according to JIS K6300-1994, and the value was converted to an index, wherein the value obtained in Comparative Example 1 was set to 100. The smaller the index is, the better the processability is.

(5) Storage Modulus (G') and Loss Factor (Tan δ):

The storage modulus and the loss factor were evaluated by measuring G' and tan δ at a temperature of 50° C., a distortion of 5% and a frequency of 15 Hz by means of a low heat generating viscoelasticity-measuring device (manufactured by Rheometric Scientific, Inc.), and the values were converted to indices, wherein the values obtained in Comparative Example 1 were set to 100.

It is shown that the larger the index of storage modulus is, the better the driving stability is, and it is shown that the smaller the index of loss factor is, the more the low heat build-up is improved.

Production Example 1

Synthesis of 2-lithio-2-methyl-1,3-dithiane (initiator C)

A glass bottle of 0.8 L equipped with a serum cap was purged by nitrogen and charged with 350 mL of dried tetrahydrofuran and 10 mL (83.5 mmol) of 2-methyl-1,3-dithiane. The bottle was cooled down to −78° C., and 55.83 mL (84.3 mmol) of a butyllithium hexane solution of 1.51M was added to the bottle. The reactants were stirred at −78° C. for 3 hours and then maintained at −25° C. for a night. The resulting solution was titrated to find that the solution contained an active lithium compound of 0.234M. In order to determine the structure of the above compound, the solution was added to 90 mL of a dried tetrahydrofuran solution containing 8.26 mL of 1-bromo-3-chloropropane (83.5 mmol) at −78° C. After 3 hours, the product was analyzed by GC/MS to find that the product contained more than 95% of 2-(3-chloropropyl)-2-methyl-1,3-dithiane. 1-Chloroheptane was not observed at all, and this showed that butyllithium was completely reacted with 2-methyl-1,3-dithiane.

Production Example 2

Synthesis of 2-lithio-2-phenyl-1,3-dithiane (initiator B)

n-Butyllithium (6.37 mL, a hexane solution of 1.68M) was dropwise added to a solution of THF (5 mL)-cyclohexane (10 mL) of 2-phenyl-1,3-dithiane (2.1 g, 10.69 mmol) at −78° C. by means of a syringe. The solution was further stirred at 0° C. for 3 hours. 0.5M of resulting 2-lithio-2-phenyl-1,3-dithiane (abbreviated as PDT-Li) was stored in a freezer under an inert atmosphere of nitrogen.

Production Example 3

Synthesis of 2-(4-dimethylamino)phenyl-1,3-dithiane

A 500 mL flask equipped with a magnetic stirrer and a reflux condenser was dried in an oven and charged with 6.89 g (46.2 mmol) of 4-(dimethylamino)benzaldehyde, 8.8 g (46.2 mmol) of p-toluenesulfonic acid monohydride and 180 mL of THF. The mixture was stirred for 10 minutes, and then 2.5 g of montmorillonite KSF was added thereto. Subsequently, 30 mL of a THF solution of 5 g (46.2 mmol) of 1,3-propanediol was added thereto. The mixture was refluxed for 12 hours under nitrogen. After cooled down to room temperature, the mixture was filtrated, and the filtrate was washed with a saturated sodium bicarbonate solution (2×100 mL) and a saturated sodium chloride solution (100 mL) and dried with magnesium sulfate (anhydrous). The solvent was concentrated, and the residue was separated by a column chromatograph (eluted by hexane/diethyl ether (85/15)) using silica gel to obtain 2-(4-dimethylamino)phenyl-1,3-dithiane.

$^1$H-NMR (CDCl$_3$): δ 1.90 (m, 1H), 2.14 (m, 1H), 2.93 (s, 6H), 2.97 (m, 4H), 5.11 (s, 1H), 6.67 (m, 2H), 7.33 (m, 2H).

$^{13}$C-NMR (CDCl$_3$): δ 25.12, 32.28, 40.46, 50.89, 112.28, 126.62, 128.46, 150.43.

Production Example 4

Synthesis of 2-lithio-2-(4-dimethylamino)phenyl-1,3-dithiane (initiator A)

n-Butyllithium (3.1 mL, a hexane solution of 1.68M) was dropwise added to a solution of 2-(4-dimethylamino)phenyl-1,3-dithiane (a solution of THF (8 mL)-triethylamine (1 mL) of 1.25 g (5.22 mmol) of the product in Example 3) at −78° C. by means of a syringe. The solution was further stirred at 0° C. for 4 hours. Resulting 2-lithio-2-(4-dimethylamino)phenyl-1,3-dithiane (abbreviated as DAPDT-Li) of 0.43M was stored in a freezer under an inert atmosphere of nitrogen.

Production Example 5

Synthesis of styrene-butadiene copolymer (copolymer (B)-1) using 2-lithio-2-methyl-1,3-dithiane A glass bottle of 0.8 L equipped with a stirrer was charged with 188 g of hexane, 57 g of a hexane solution of styrene of 33% by weight and 256 g of a hexane solution of butadiene of 22.0% by weight. Then, added thereto were 18 mL of a hexane solution of a cyclic oligomeric oxolanyl alkane modifier of 1.6M and 9.6 mL of a tetrahydrofuran solution of 2-lithio-2-methyl-1,3-dithiane (initiator C) of 2.5M. Then, the bottle was heated to 54° C., and a temperature of the reaction solution reached 76.5° C. after 15 minutes. Further, after 25 minutes passed, the reaction solution was take out from the bottle and coagulated in isopropanol containing butylated hydroxytoluene (BHT), and the coagulated substance was dried on a drum to obtain a copolymer (B)-1.

Production Example 6

Synthesis of styrene-butadiene copolymer (copolymer (B)-2) using 2-lithio-2-phenyl-1,3-dithiane A glass bottle of 0.8 mL was charged with 190 g of hexane, 18.8 g of styrene and 256 g of butadiene (a hexane solution of 22% by weight), and then 49.5 mL of PDT-Li (initiator B produced in Production Example 2) was added thereto by means of a syringe. The bottle was heated to 50° C., and the solution was stirred for 1.5 hour. A small amount of 2-propanol was added to the reaction solution containing the polymer to terminated the reaction, and the solution was treated with 4 mL of a BHT solution. It was finally treated with 2-propanol and dried on a drum to obtain a copolymer (B)-2.

Production Example 7

Synthesis of styrene-butadiene copolymer (copolymer (B)-3) using 2-lithio-2-(4-dimethylamino)phenyl-1,3-dithiane A glass bottle of 0.8 mL was charged with 188 g of hexane, 57 g of styrene (a hexane solution of 33% by weight) and 256 g of butadiene (a hexane solution of 22% by weight), and then 56 mL of DAPDT-Li (initiator A produced in Production Example 4) and 18 mL of a cyclic oligomeric oxolanyl alkane (a hexane solution of 1.6M) were added thereto by means of a syringe. The bottle was heated to 50° C., and the solution was stirred for 1.5 hour.

A small amount of 2-propanol was added to the reaction solution containing the polymer to terminated the reaction, and the solution was treated with 5 mL of a BHT solution. It was finally treated with 2-propanol and dried on a drum to obtain a copolymer (B)-3.

Production Example 8

Synthesis of styrene-butadiene copolymers (copolymers (B)-4 to 12) using 2-lithio-2-(4-dimethylamino)phenyl-1,3-dithiane (initiator A)

Aromatic vinyl compound-diene compound copolymers (B)-4 to (B)-12 which had weight average molecular weights of 10,000, 20,000, 40,000, 80,000, 120,000, 150,000, 200,000, 300,000 and 400,000 respectively and comprised 25% by mass of styrene and in which a content of a vinyl bond in the part of butadiene was 65% by mass were prepared in the same manner as in Production Example 7.

While a ratio of a hexane solution of a cyclic oligomeric oxolanyl alkane modifier and DAPDT-Li (initiator A) was maintained at a fixed level, the amount of the solution was varied whereby the molecular weights were controlled.

Production Example 9

Synthesis of a Low Molecular Weight Aromatic Vinyl Compound-Diene Compound Copolymer (B)-13 which does not have a Functional Group at an End A copolymer was synthesized in the same manner as in Production Example 7, except that 0.19 mL of a hexane solution of n-butyllithium (initiator D) of 1.6M was used in place of DAPDT-Li (initiator A) used in Production Example 7.

Examples 1 to 11 and Comparative Examples 1 to 3

The respective components for a tread formulation based on recipes shown in Table 1 were kneaded by an ordinary method to prepare rubber compositions, wherein the low molecular weight aromatic vinyl compound-diene compound copolymers (B)-1 to (B)-11 having a function group at an end were used in the examples, and no low molecular weight copolymer or the aromatic vinyl compound-diene compound copolymer (B)-12 which was provided with a functional group at an end but had a molecular weight falling in a larger range than prescribed in the present invention or the low molecular weight aromatic vinyl compound-diene compound copolymer (B)-13 which was not provided with a functional group at an end was used in the comparative examples.

TABLE 1

|  | Parts by mass |
|---|---|
| SBR*1 | 100 |
| Copolymer (B) *2 | 30 |
| Carbon black*3 | 65 |
| Stearic acid | 2 |
| Zinc oxide | 3 |
| Antioxidant 6C*4 | 1 |
| Vulcanization accelerator DPG*5 | 0.4 |
| Vulcanization accelerator NS*6 | 1 |
| Sulfur | 1.75 |

Notes:
1) SBR #1500 (manufactured by JSR Corporation)
2) Low molecular weight aromatic vinyl compound-diene compound copolymers (B)-1 to (B)-13
3) ISAF, SEAST 3H (manufactured by Tokai Carbon Co., Ltd.)
4) N-(1,3-dimethylbutyl)-N'-phenyl-p-phenylenediamine
5) Diphenylguanidine
6) N-t-butyl-2-benzothiazylsulfenamide The rubber compositions were vulcanized under the conditions of 160° C. and 15 minutes in the respective examples and comparative examples to evaluate processability (Mooney viscosity), a storage modulus (G') and a loss factor (tan δ) of the vulcanized rubbers. They were evaluated by converting the values to indices, wherein the values obtained in Comparative Example 1 were set to 100. It is shown that the smaller the index of processability is, the better the processability is, and it is shown that the larger the index of storage modulus is, the better the driving stability is. It is shown that the smaller the index of loss factor is, the more the low heat build-up is improved. The results thereof are shown in Table 2.

TABLE 2

|  |  | Comparative Example | | Example | | | | |
|---|---|---|---|---|---|---|---|---|
|  |  | 1 | 2 | 1 | 2 | 3 | 4 | 5 |
| Copolymer (B) | Kind of low molecular weight polymer | Oil | B-13 | B-3 | B-2 | B-1 | B-4 | B-5 |
|  | Polymerization initiator |  | D | A | B | C | A | A |
|  | Styrene content (wt %) |  | 25 | 25 | 25 | 25 | 25 | 25 |
|  | Vinyl content (wt %) |  | 65 | 65 | 65 | 65 | 65 | 65 |
|  | Molecular weight (K) |  | 5 | 5 | 5 | 5 | 10 | 20 |
| Rubber composition physical properties | Processability (ML$_{1+4}$) (index) | 100 | 75 | 75 | 77 | 76 | 80 | 86 |
|  | Storage modulus (G') (index) | 100 | 88 | 106 | 108 | 105 | 113 | 119 |
|  | tan δ (index) | 100 | 116 | 95 | 97 | 96 | 90 | 82 |

TABLE 2-continued

|  |  | Example | | | | | | Comparative Example |
|---|---|---|---|---|---|---|---|---|
|  |  | 6 | 7 | 8 | 9 | 10 | 11 | 3 |
| Copolymer (B) | Kind of low molecular weight polymer | B-6 | B-7 | B-8 | B-9 | B-10 | B-11 | B-12 |
|  | Polymerization initiator | A | A | A | A | A | A | A |
|  | Styrene content (wt %) | 25 | 25 | 25 | 25 | 25 | 25 | 25 |
|  | Vinyl content (wt %) | 65 | 65 | 65 | 65 | 65 | 65 | 65 |
|  | Molecular weight (K) | 40 | 80 | 120 | 150 | 200 | 300 | 400 |
| Rubber composition physical properties | Processability ($ML_{1+4}$) (index) | 89 | 97 | 103 | 110 | 124 | 130 | 141 |
|  | Storage modulus (G') (index) | 125 | 126 | 124 | 124 | 119 | 117 | 105 |
|  | tan δ (index) | 77 | 75 | 76 | 78 | 79 | 77 | 74 |

In Comparative Example 1, the low molecular weight copolymer was not used, and a process oil (A/0 MIX, manufactured by Sankyo Yuka Kogyo K.K.) was used in place of it. In Comparative Example 2, a conventional initiator was used.

Examples 12 to 15 and Comparative Example 4

The respective components for a tread formulation based on recipes shown in Table 3 were kneaded by an ordinary method to prepare rubber compositions, wherein the low molecular weight aromatic vinyl compound-diene compound copolymer (B)-5 was used, and a use amount thereof was varied. Comparative Example 4 is a case in which a compounding amount of the copolymer falls outside the range of the present invention.

TABLE 3

|  | Parts by mass |
|---|---|
| SBR*1 | 100 |
| Copolymer (B) *2 | varied |
| Carbon black*3 | 65 |

TABLE 3-continued

|  | Parts by mass |
|---|---|
| Stearic acid | 2 |
| Zinc oxide | 3 |
| Antioxidant 6C*4 | 1 |
| Vulcanization accelerator DPG*5 | 0.4 |
| Vulcanization accelerator NS*6 | 1 |
| Sulfur | 1.75 |

Notes:
1) SBR #1500 (manufactured by JSR Corporation)
2) Low molecular weight aromatic vinyl compound-diene compound copolymer (B)-5
3) ISAF, SEAST 3H (manufactured by Tokai Carbon Co., Ltd.)
4) N-(1,3-dimethylbutyl)-N'-phenyl-p-phenylenediamine
5) Diphenylguanidine
6) N-t-butyl-2-benzothiazylsulfenamide The rubber compositions prepared in the respective examples and comparative examples were used to evaluate processability (Mooney viscosity), a storage modulus (G') and a loss factor (tan δ) of vulcanized rubbers in the same manners as in Examples 1 to 11 and Comparative Examples 1 to 3. They were evaluated by converting the values to indices, wherein the values obtained in Comparative Example 1 were set to 100. The results thereof are shown in Table 4.

TABLE 4

|  |  | Comparative Example | Example | | | |
|---|---|---|---|---|---|---|
|  |  | 4 | 12 | 13 | 14 | 15 |
| Copolymer (B) | Kind of low molecular weight polymer | B-5 | B-5 | B-5 | B-5 | B-5 |
|  | Polymerization initiator | A | A | A | A | A |
|  | Styrene content (wt %) | 25 | 25 | 25 | 25 | 25 |
|  | Vinyl content (wt %) | 65 | 65 | 65 | 65 | 65 |
|  | Molecular weight (K) | 20 | 20 | 20 | 20 | 20 |
|  | Compounding amount (parts by mass) | 4 | 15 | 55 | 75 | 110 |
| Rubber composition physical properties | Processability ($ML_{1+4}$) (index) | 113 | 105 | 75 | 55 | 40 |
|  | Storage modulus (G') (index) | 100 | 112 | 126 | 120 | 105 |
|  | tan δ (index) | 97 | 88 | 81 | 88 | 96 |

It can be found from the results shown in Tables 2 and 4 that the rubber compositions of the present invention are excellent in a storage modulus (driving stability) and a loss factor (low heat build-up) as compared with the rubber compositions falling outside the ranges of the present invention.

The invention claimed is:

1. A rubber composition comprising 100 parts by mass of a rubber component (A) comprising at least one rubber of natural rubber and synthetic diene base rubbers, which contains 50% by mass or more of a styrene-butadiene copolymer or a butadiene polymer (A1) having a weight average molecular weight of 300,000 to 1,500,000, comprising 0 to 60% by mass of an aromatic vinyl compound, and a content of a vinyl bond in the part of the diene compound is 10 to 80% by mass, and 5 to 120 parts by mass of a low molecular weight aromatic vinyl compound-diene compound copolymer (B) having a weight average molecular weight (measured by gel permeation chromatography and reduced to polystyrene) of 1,000 to 300,000 and molecular weight distribution Mw/Mn is 5.0 or less, wherein the copolymer (B) comprises 0 to 80% by mass of an aromatic vinyl compound and has a vinyl bond content of 0 to 80% by mass in the part of the diene compound, and has at least one cross-linkable functional group at an end, which is reacted with the natural rubber and/or the synthetic diene base rubbers by forming active sites through cleavage reaction, decomposition reaction or addition reaction, and wherein the rubber composition comprises $1.0 \times 10^{-6}$ to $5.5 \times 10^{-5}$ mol of copolymer (B) calculated by the Mn of the copolymer (B) based on 1 g of the styrene-butadiene copolymer or the butadiene polymer (A1).

2. The rubber composition as described in claim 1, wherein the cross-linkable functional group has at least one sulfur atom.

3. The rubber composition as described in claim 1, wherein the copolymer (B) has a cross-linkable functional group at one end and a functional group having affinity with a filler at the other end.

4. The rubber composition as described in claim 1, wherein the copolymer (B) has a weight average molecular weight of 1,000 to 200,000.

5. The rubber composition as described in claim 4, wherein the copolymer (B) has a weight average molecular weight of 1,000 to 150,000.

6. The rubber composition as described in claim 5, wherein the copolymer (B) has a weight average molecular weight of 1,000 to 100,000.

7. The rubber composition as described in claim 1, wherein the copolymer (B) comprises 0 to 60% by mass of the aromatic vinyl compound and has a vinyl bond content of 0 to 80% by mass in the part of the diene compound.

8. The rubber composition as described in claim 7, wherein the copolymer (B) comprises 0 to 60% by mass of the aromatic vinyl compound and has a vinyl bond content of 0 to 60% by mass in the part of the diene compound.

9. The rubber composition as described in claim 8, wherein the copolymer (B) comprises 0 to 50% by mass of the aromatic vinyl compound and has a vinyl bond content of 0 to 60% by mass in the part of the diene compound.

10. The rubber composition as described in claim 9, wherein the copolymer (B) comprises 0 to 50% by mass of the aromatic vinyl compound and has a vinyl bond content of 0 to 50% by mass in the part of the diene compound.

11. The rubber composition as described in claim 1, wherein a content of the copolymer (B) is 5 to 80 parts by mass.

12. The rubber composition as described in claim 11, wherein a content of the copolymer (B) is 5 to 60 parts by mass.

13. The rubber composition as described in claim 1, wherein the copolymer (B) is a copolymer obtained by subjecting the aromatic vinyl compound and the diene compound to anionic polymerization with using a sulfur-containing polymerization initiator represented by the following formula:

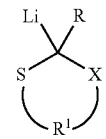

(wherein R is selected from a trialkylsilyl group having 1 to 6 carbon atoms, an alkyl group having 1 to 20 carbon atoms, a cycloalkyl group having 4 to 20 carbon atoms, an aryl group having 6 to 20 carbon atoms, a thienyl group, a furyl group and a pyridyl group, and R may be optionally substituted with at least one of the following functional groups: an alkyl group having 1 to 10 carbon atoms, an aryl group having 6 to 20 carbon atoms, an alkenyl group having 2 to 10 carbon atoms, a non-terminal alkynyl group having 3 to 10 carbon atoms, ether, tert-amine, oxazoline, thiazoline, phosphine, sulfide and silyl; $R^1$ is selected from the group consisting of alkylene groups having 2 to 8 carbon atoms; and X is selected from the group consisting of sulfur, oxygen and NR (R is the same as defined above)).

14. The rubber composition as described in claim 1, wherein the rubber composition is used for a tire.

15. A tire prepared by using the rubber composition as described in claim 14.

16. A tire prepared by using the rubber composition as described in claim 1 for a tread member.

* * * * *